(12) United States Patent
Coppola

(10) Patent No.: US 8,148,651 B1
(45) Date of Patent: Apr. 3, 2012

(54) PET FEEDING AND WEIGHING SYSTEM

(76) Inventor: Judith M. Coppola, Montrose, NY (US)

( * ) Notice: Subject to any disclaimer, the term of this patent is extended or adjusted under 35 U.S.C. 154(b) by 260 days.

(21) Appl. No.: 12/683,790

(22) Filed: Jan. 7, 2010

Related U.S. Application Data

(60) Provisional application No. 61/276,898, filed on Sep. 17, 2009.

(51) Int. Cl.
A01K 5/01 (2006.01)
A01K 7/00 (2006.01)
G01G 19/00 (2006.01)
G01G 19/52 (2006.01)
G01G 21/28 (2006.01)

(52) U.S. Cl. .................. 177/25.16; 177/25.19; 177/126; 177/238; 177/262; 119/51.01; 119/174

(58) Field of Classification Search ............... 177/25.16, 177/25.19, 126, 127, 238–245, 262; 119/174, 119/51.01
See application file for complete search history.

(56) References Cited

U.S. PATENT DOCUMENTS

| 2,536,125 | A | * | 1/1951 | Crosset | 177/262 |
|---|---|---|---|---|---|
| 3,481,415 | A | * | 12/1969 | Hutchinson | 177/253 |
| 3,592,277 | A | * | 7/1971 | Ackeret | 177/126 |
| 3,967,690 | A | * | 7/1976 | Northcutt | 177/25.19 |
| 4,113,039 | A | * | 9/1978 | Ozaki et al. | 177/25.19 |
| 4,301,879 | A | * | 11/1981 | Dubow | 177/5 |
| 4,318,447 | A | * | 3/1982 | Northcutt | 177/25.19 |
| 4,423,792 | A | * | 1/1984 | Cowan | 177/25.19 |
| 4,617,876 | A | * | 10/1986 | Hayes | 119/842 |
| 4,811,694 | A | | 3/1989 | Holmquist | |
| 5,033,561 | A | * | 7/1991 | Hettinger | 177/25.16 |
| 5,044,453 | A | * | 9/1991 | Bankier et al. | 177/25.16 |
| 5,388,043 | A | * | 2/1995 | Hettinger | 600/300 |
| 6,358,215 | B1 | * | 3/2002 | Ricciardelli | 600/532 |
| 6,850,798 | B2 | * | 2/2005 | Morgan et al. | 600/547 |
| 6,868,804 | B1 | * | 3/2005 | Huisma et al. | 119/842 |
| 7,170,016 | B2 | * | 1/2007 | Dumornay et al. | 177/25.13 |
| 7,637,154 | B1 | * | 12/2009 | Robbins | 73/429 |
| 7,851,711 | B2 | * | 12/2010 | Rump | 177/25.16 |
| 2002/0152964 | A1 | * | 10/2002 | van der Lely et al. | 119/51.02 |
| 2004/0118618 | A1 | * | 6/2004 | Davidson et al. | 177/25.13 |
| 2007/0050058 | A1 | * | 3/2007 | Zuziak et al. | 700/90 |
| 2009/0205876 | A1 | * | 8/2009 | Claypool | 177/25.13 |
| 2010/0038149 | A1 | * | 2/2010 | Corel | 177/25.16 |

FOREIGN PATENT DOCUMENTS

GB 2454658 5/2009
GB 2465569 A * 5/2010

* cited by examiner

Primary Examiner — Randy W Gibson

(57) ABSTRACT

A pet feeding and weighing system for efficiently providing a weighing platform having one or more feeding bowls therein to allow for a pet to be weighed in a consistent manner when the pet returns for food or drink. The pet feeding and weighing system generally includes a platform having a feeding portion and a weighing portion extending therefrom, wherein the feeding portion includes at least one opening extending therethrough and at least one feeding container is positioned within the opening. A plurality of weight sensors are in communicative contact with the weighing portion and a local digital display responsive to the weight sensor indicates a weight applied upon the weighing portion of the platform over the weight sensor. The present invention may also include a controller having memory for storing and allowing the retrieval of past weight measurements along with their respective date and time taken.

20 Claims, 12 Drawing Sheets

PET FEEDING AND WEIGHING SYSTEM

CROSS REFERENCE TO RELATED APPLICATIONS

I hereby claim benefit under Title 35, United States Code, Section 119(e) of U.S. provisional patent application Ser. No. 61/276,898 filed Sep. 17, 2009. The 61/276,898 application is currently pending. The 61/276,898 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a pet accessory and more specifically it relates to a pet feeding and weighing system for efficiently providing a weighing platform having one or more feeding bowls therein to allow for a pet to be weighed in a consistent manner when the pet returns for food or drink.

2. Description of the Related Art

Any discussion of the related art throughout the specification should in no way be considered as an admission that such related art is widely known or forms part of common general knowledge in the field.

Pet obesity is an increasing problem among cats, dogs, and other household pets. Pet obesity can lead to various health issues including diabetes, heart disease, among others. An effective way in which to accurately measure whether a given pet is obese is to position the pet upon a weighing scale.

However, it can be often times be difficult to keep the pet in a still position while on the weighing scale in order to allow an accurate measurement to be taken. Also, many household weighing scales are not large enough to fit the entire pet thereon and thus do not provide accurate weight measurements for the pet. Because of the inherent problems with the related art, there is a need for a new and improved pet feeding and weighing system for efficiently providing a weighing platform having one or more feeding bowls therein to allow for a pet to be weighed in a consistent manner when the pet returns for food or drink.

BRIEF SUMMARY OF THE INVENTION

A system for efficiently providing a weighing platform having one or more feeding bowls therein to allow for a pet to be weighed in a consistent manner when the pet returns for food or drink. The invention generally relates to a pet accessory which includes a platform having a feeding portion and a weighing portion extending therefrom, wherein the feeding portion includes at least one opening extending therethrough and at least one feeding container is positioned within the opening. A plurality of weight sensors are in communicative contact with the weighing portion and a local digital display responsive to the weight sensor indicates a weight applied upon the weighing portion of the platform over the weight sensor. The present invention may also include a controller having memory for storing and allowing the retrieval of past weight measurements along with their respective date and time taken.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
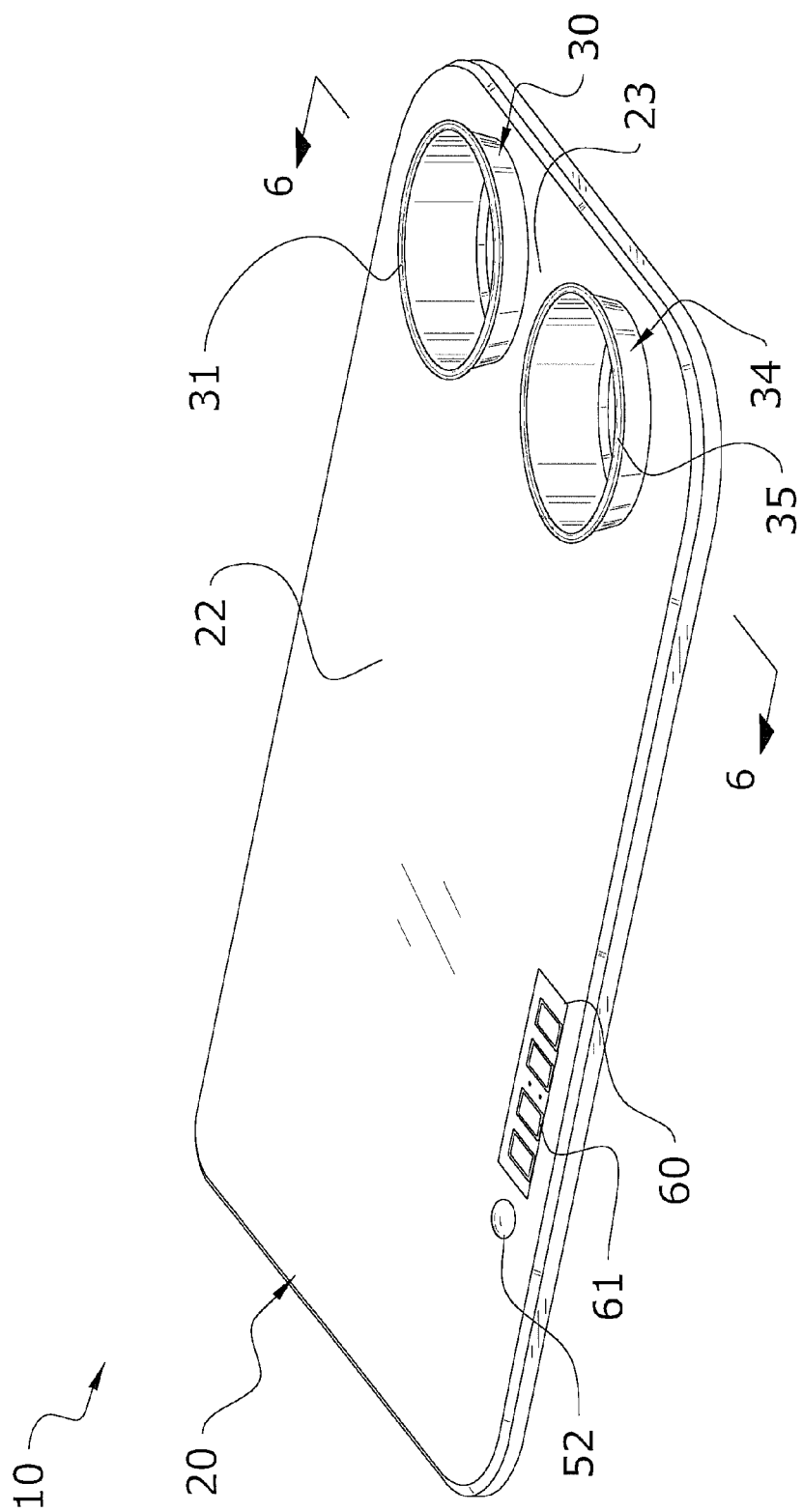
FIG. 1 is an upper perspective view of the present invention.

Turning now descriptively to the drawings, in which similar reference characters denote similar elements throughout the several views, FIGS. 1 through 12 illustrate a pet feeding and weighing system 10, which comprises a platform 20 having a feeding portion 23 and a weighing portion 22 extending therefrom, wherein the feeding portion 23 includes at least one opening 24, 26 extending therethrough and at least one feeding container 30, 34 is positioned within the opening 24, 26. A plurality of weight sensors 40 are in communicative contact with the weighing portion 22 and a local digital display 60 responsive to the weight sensors 40 indicates a weight applied upon the weighing portion 22 of the platform 20 over the weight sensors 40. The term "feeding" as used throughout with the feeding portion 23 and the containers 30, 34 may refer to the act of eating, such as with pet food, and/or drinking, such as with drinking water. Various types of pets may use the present invention, such as but not limited to cats and dogs.

B. Platform

Figure 3:
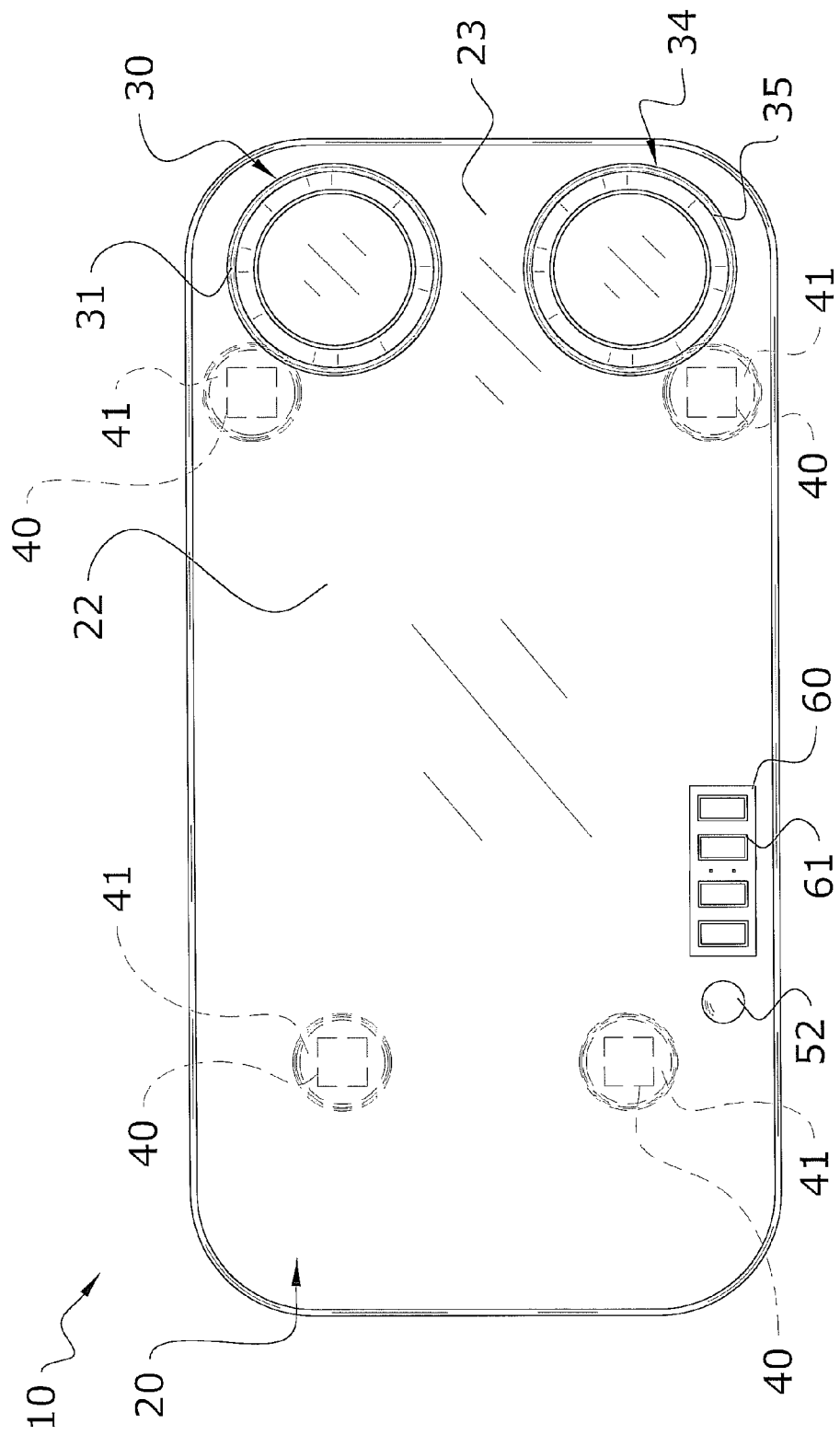
FIG. 3 is a top view of the present invention.
Figure 4:
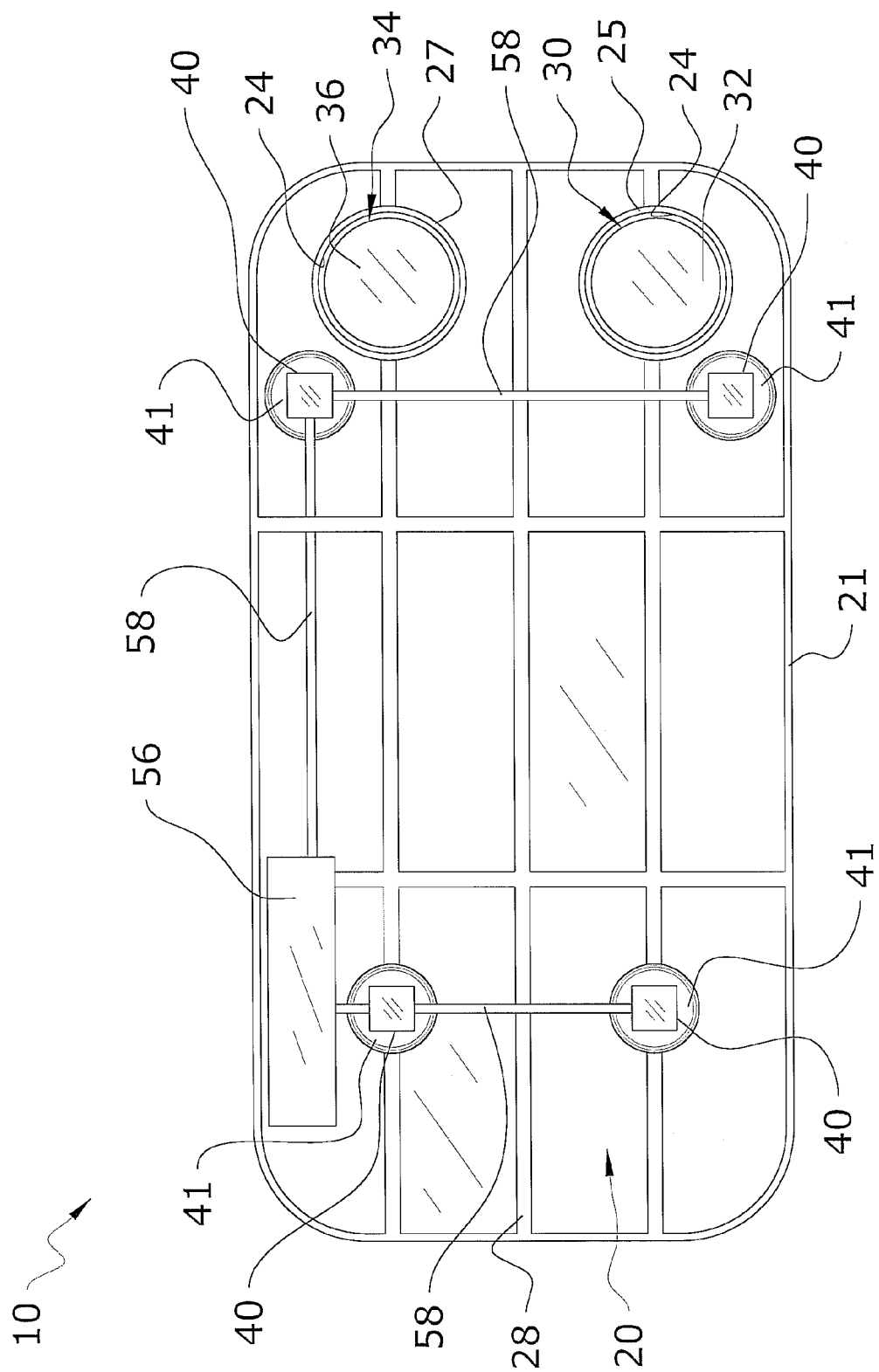
FIG. 4 is a bottom view of the present invention.
Figure 5:
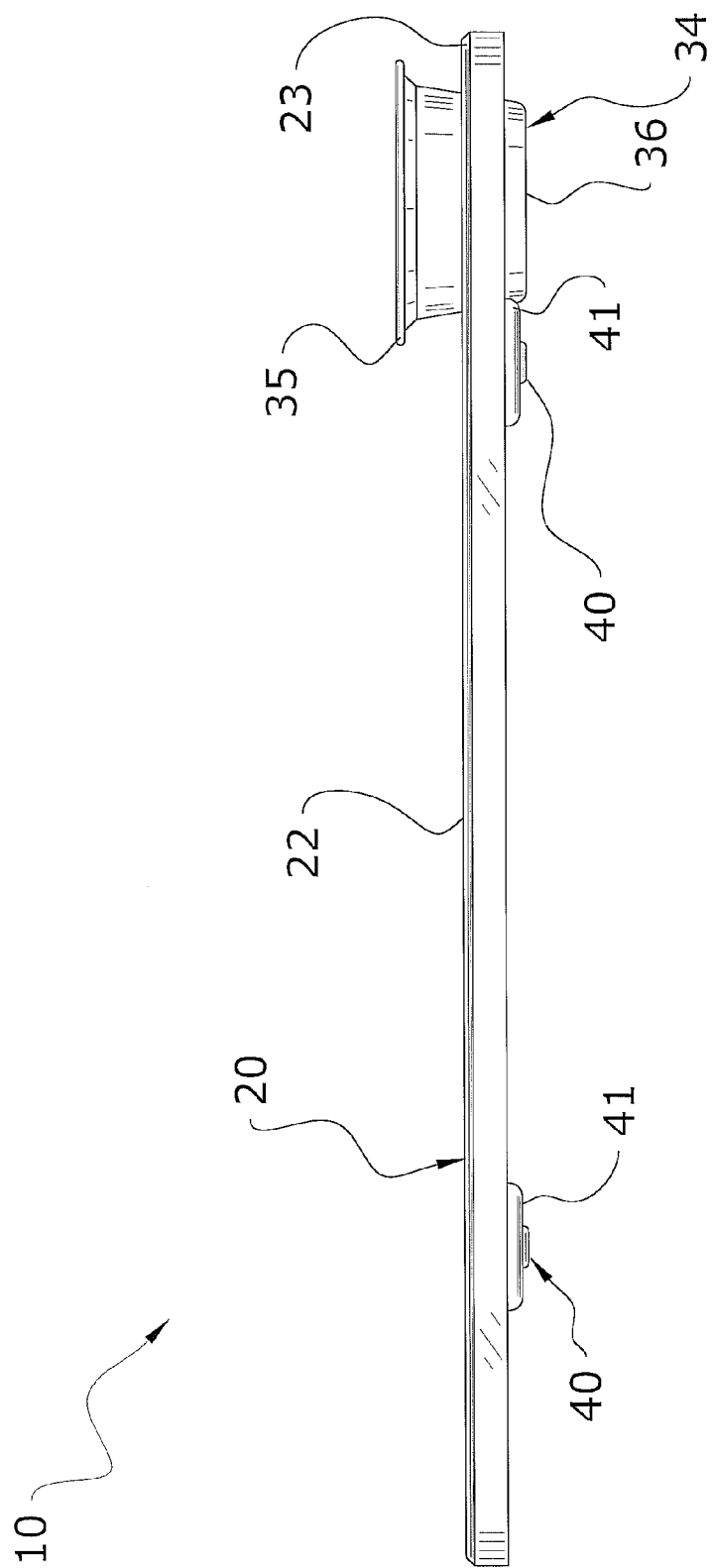
FIG. 5 is a side view of the present invention.
Figure 6:
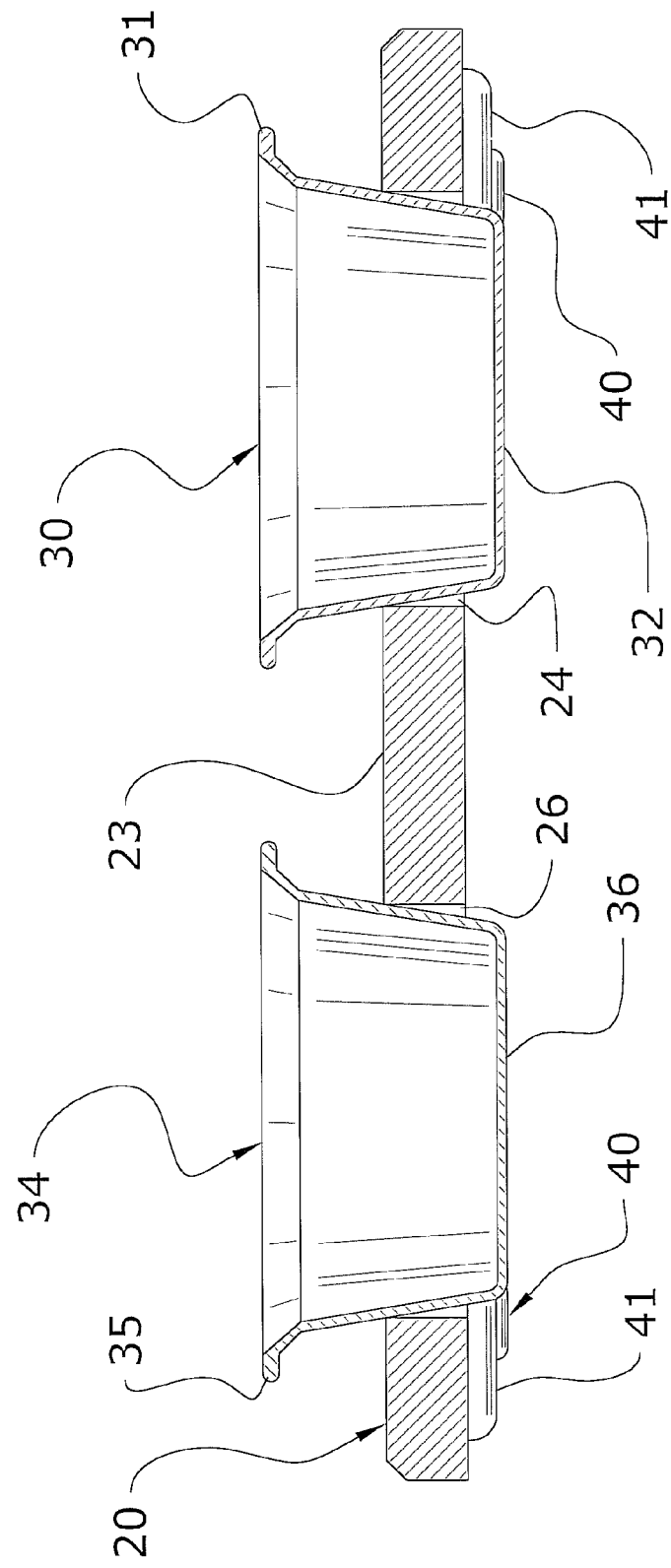
FIG. 6 is a sectional view taken along lines 6-6 of FIG. 1.
Figure 8:
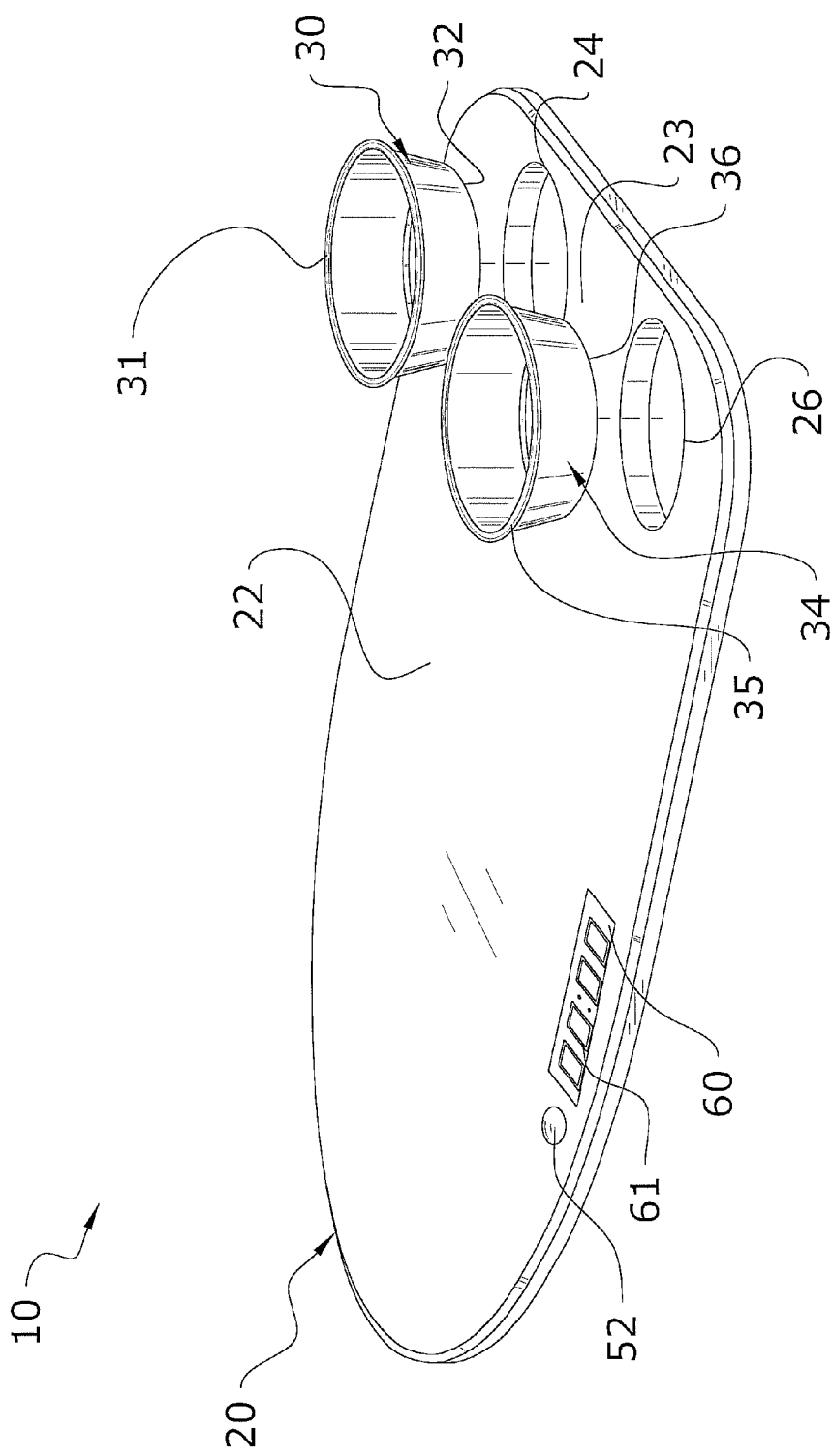
FIG. 8 is an upper perspective view of an alternate embodiment of the present invention illustrating a different shaped platform and base with the containers exploded from the openings.
Figure 9:
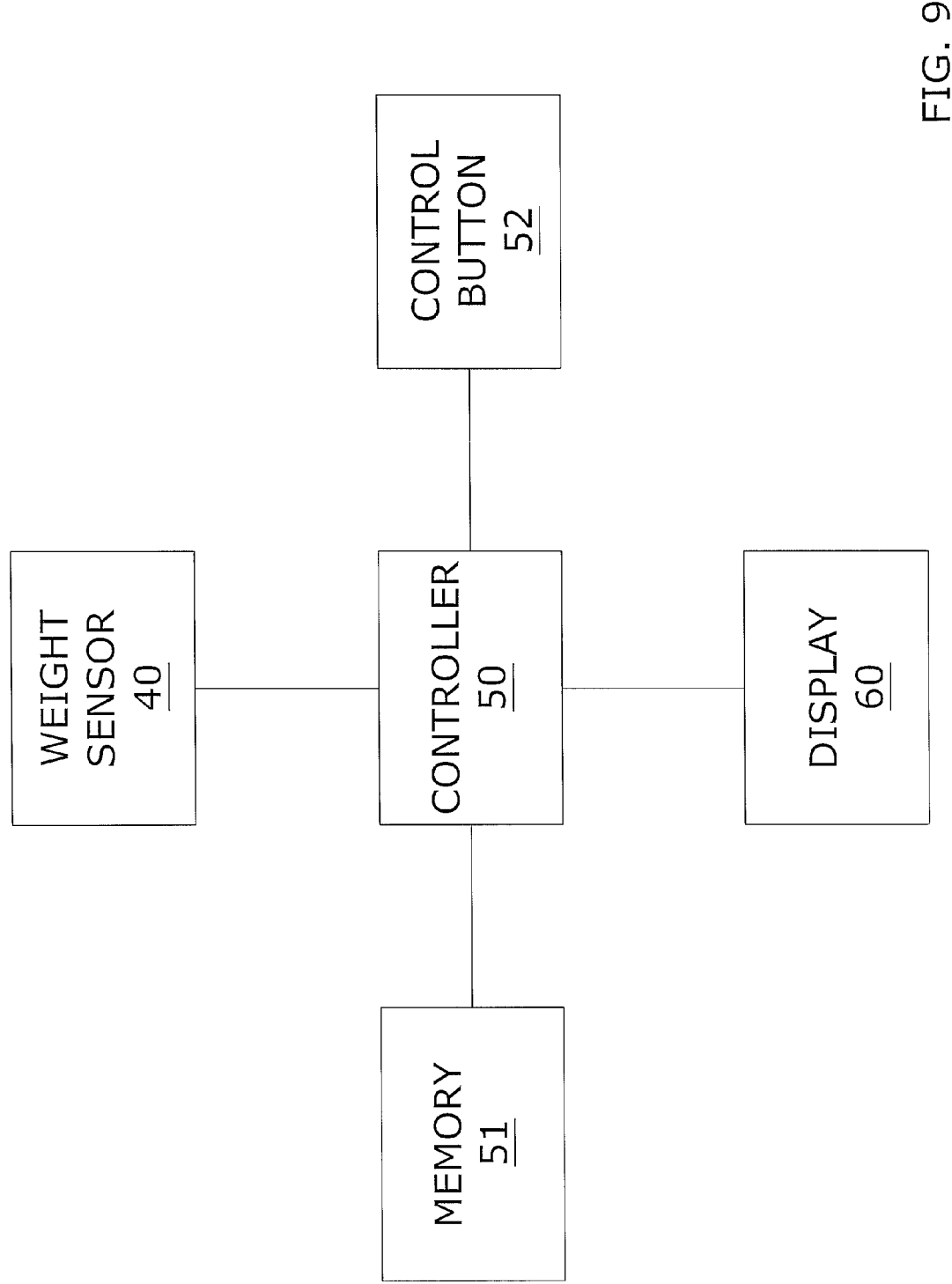
FIG. 9 is a block diagram of the weight measuring system of the present invention.

The platform 20 is generally comprised of a rigid structure capable of holding the weight of various size pets. The platform 20 also generally has a substantially rectangular shape with rounded corners as best illustrated in FIGS. 3 and 4. Other shapes may be appreciated, such as having an arced or pointed end as illustrated in FIG. 8 or various other shapes. The peripheral edge of the platform 20 preferably does not have any sharp corners to prevent damaging engagement with the pet or individual. A rim 21 may extend downwardly from the peripheral edge of the platform 20 to provide support and to conceal the underside of the platform 20 from engagement with the pets.

The platform 20 is preferably comprised of a smooth textured surface and easy to clean surface to maintain a clean feeding environment for the pet. Various materials may be used for the outer surfaces of the platform 20. It is appreciated that the platform 20 may be comprised of various alternate embodiments all which allow for a weighing surface in which a pet to stand upon while feeding. The platform 20 may be comprised of various colors, designs, or include various structural features, such as paw imprints where it is desired for a pet to place their feet when standing upon the weighing portion 22 and accessing the feeding portion 23.

The platform 20 generally includes the feeding portion 23 located at a first longitudinal end of the platform 20 and the weighing portion 22 extending from the feeding portion 23 towards a second longitudinal end of the platform 20. The feeding portion 23 and the weighing portion 22 are generally located along a common planar surface and are substantially integral with each other so as to appear as a single planar surface. It is appreciated that the weighing portion 22 is generally substantially long in length so that the pet is able to completely fit upon the weighing portion 22 when accessing the feeding portion 23 thus being able to record an accurate weight measurement of the pet.

The weighing portion 22 generally comprising most of the surface area of the platform 20 and the feeding portion 23 extends from or is integral with the weighing portion 22. The weighing portion 22 is in communicative contact with the weight sensors 40, wherein a pet standing on the weighing portion 22 of the platform 20 will have its weight measured by the weight sensors 40 and indicated on the display 60.

Generally, the weighing portion 22 is the area of the platform 20 in which the pet would stand when accessing the food or drink located within the area of the feeding portion 23 of the platform 20. As stated, it is also appreciated that the weighing portion 22 may be integral with the feeding portion 23, wherein the weight sensors 40 could also be in communicative contact with the feeding portion 23 of the platform 20.

Figure 2:
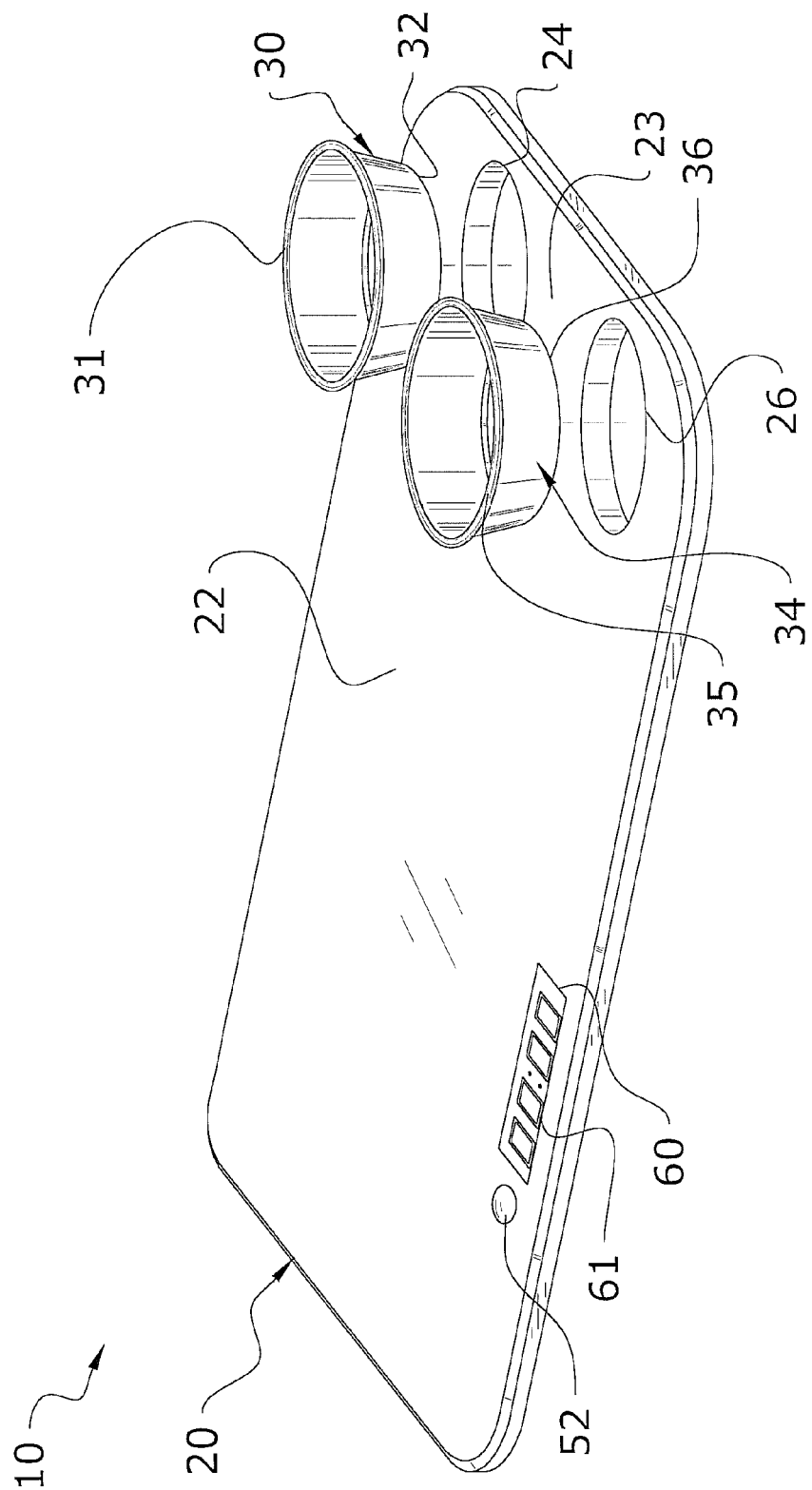
FIG. 2 is an upper perspective view of the present invention with the containers exploded from the openings.

The feeding portion 23 includes at least one opening 24, 26 for a container 30, 34 to be positioned within. In the preferred embodiment, the feeding portion 23 includes a first opening 24 and a second opening 26 for a first container 30 and a second container 34 as illustrated in FIG. 2. Each opening 24, 26 and respective container 30, 34 is located adjacent a corner of the feeding portion 23 of the platform 20.

The openings 24, 26 are generally large enough to receive the containers 30, 34 so that the bottom 32, 36 of the containers 30, 34 rests upon the floor below and the containers 30, 34 may be easily removed and replaced as necessary. The openings 24, 26 also generally receive the containers 30, 34 in a manner to prevent the containers 30, 34 from moving from side to side when being accessed by the pet. Thus the diameter of the openings 24, 26 is substantially similar to the diameter of the containers 30, 34 when the containers 30, 34 are positioned at a desired height within the openings 24, 26 (the containers 30, 34 may be tapered).

The openings 24, 26 are generally circular in shape; however other shapes may be appreciated all which correlate to the cross-sectional shape of the containers 30, 34. Each of the openings 24, 26 may also include a rim 21, 27 extending downward from a peripheral edge for substantially preventing spilled food or water from traveling below the platform 20.

Figure 7:
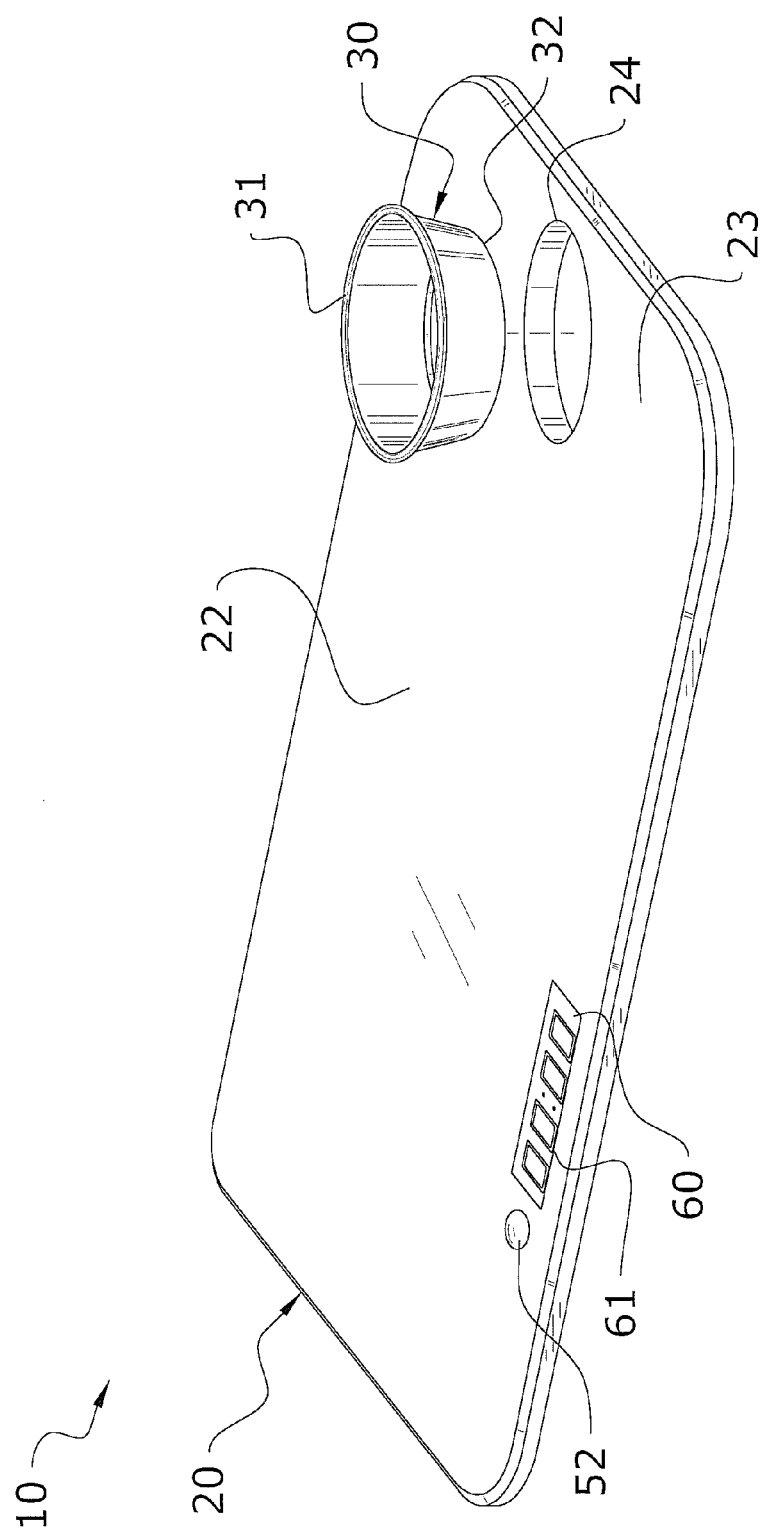
FIG. 7 is an upper perspective view of an alternate embodiment of the present invention illustrating only one container and opening utilized with the container exploded from the opening.

Alternatively, the feeding portion 23 may include a singular opening 24 when just one container 30 is to be utilized as illustrated in FIG. 7. The singular opening 24 is similar in structure to as previously described with the preferred embodiment. The singular opening 24 is generally centered laterally across the platform 20 in the feeding portion 23; however it is appreciated that the singular opening 24 may be located at various locations on the feeding portion 23.

The underside of the platform 20 preferably includes a plurality of support members 28 to prevent the platform 20 from sagging or breaking when heavy objects or pets are placed thereon. The support members 28 may be arranged in various manners all which provide support to the platform 20 without interfering with the operation of the placement of the feeding containers 30, 34 or the weight sensors 40, among other components of the present invention. In the preferred embodiment, the support members 28 extend in a criss-cross manner along the underside of the platform 20.

The support members 28 generally include a plurality of gaps to allow for the passage of conduit members 58 carrying electrical wire or components therethrough. The gaps preferably allow for the connection of the weight sensors 40 and/or the controller 50 leading to the display 60.

C. Containers

The containers 30, 34 are preferably removably positioned within each of the openings 24, 26; however a fixed connection of the containers 30, 34 to the platform 20 may be appreciated. The containers 30, 34 are generally circular in cross-section, such as with a common bowl or pet dish and are rigid and heavy in construction so as not to be chewed, damaged, or removed from the opening, by the pet. Generally, a first container 30 is used for positioning food therein and a second container 34 is used for positioning drinking water therein. The embodiment of the present invention utilizing a singular container 30 in FIG. 7 may be used for food and/or water.

When the containers 30, 34 are positioned within the openings 24, 26, the brim 31, of each of the containers 30, 34 preferably extends above the platform 20 to be easily grasped when removing and replacing the container 30, 34 within the respective opening 24, 26. The bottom 32, 36 of each of the containers 30, 34 preferably rests upon the floor similar to the weight sensors 40 to stabilize the containers 30, 34 in a level manner. It is appreciated that the containers 30, 34 rest upon the floor independent of the weight sensors so as not to interfere with the operation of the weight sensors 40 and the accurate measurement of weight placed upon the platform 20.

It is emphasized that the containers 30, 34 do not rest upon or pull down upon the platform 20 so as to prevent the containers 30, 34 from affecting the weight measurement taken by the weight sensors 40. Also, being positioned within the openings 24, 26 and surrounded by the platform 20 helps to ensure that the containers 30, 34 remain in place while being accessed by the pet, wherein the pet may be able to easily move the containers 30, 34 and thus the containers 30, 34 would not remain still upon the platform 20 for weight measurement of the pet if the containers 30, 34 were positioned outside the peripheral edge or rim 21 of the platform 20.

D. Weight Sensors

The present invention generally includes a plurality of weight sensors 40 located underneath the platform 20 and in contact with the platform 20. The weight sensors 40 are generally comprised of a load cell structure to convert a force placed upon the platform 20 and applied onto the weight sensors 40 to an electric signal to send to the controller 50.

Various types of load cell weight sensors common in the prior art of weighing scales may be utilized with the present invention. The weight sensors 40 are generally positioned adjacent the corners of the weighing portion 22 to ensure an accurate measurement of weight is measured.

It is appreciated that more or less than the illustrated 4 weight sensors 40 may be utilized with the present invention. Various other types of weight sensors may also be utilized, such as mechanical weighing scales, etc. It is also appreciated that the weight sensors 40 may be of various sizes and configurations and may also be positioned in various locations relative the platform 20.

It is also appreciated that the weight sensors 40 may be integral with the weighing portion 22 so as to be directly stepped upon by the pet. The weight sensors 40 may further be integral with the entire platform 20, wherein the entire platform 20 or a portion of the platform 20 is vertically movable. It is emphasized that various types of weight sensors 40 may be utilized and the weight sensors 40 may be connected or in communicative contact with the platform 20 in various manners all which allow for the weight of a pet to be measured when stepping upon the weighing portion 22 of the platform 20.

The weight sensors 40 may be attached to the underside of the platform 20 through the use of fasteners and various types of supports or support plates 41. Each of the weight sensors 40 are preferably electrically connected via electrical wire, etc., wherein the electrical wire is directed through conduit members 58 underneath the platform 20 to prevent exposure to the pets.

E. Controller

A circuit or controller 50 is preferably electrically connected to the weight sensors 40 and the display 60 and is positioned underneath the platform 20. The controller 50 may be used for transforming the readout taken by the weight sensors 40 into the units (e.g. pounds, kilograms, etc.) desired to be shown upon the display 60. The controller 50 also includes memory 51 thus allowing for the storage and retrieval of past weight measurements 63. Each current weight measurement 61 taken by the weight sensors 40 and shown upon the display 60 is preferably automatically stored by the controller 50 along with the associated date and time of the current weight measurement 61.

Thus, the operator is able to view past weight measurements 63 by accessing the memory 51 of the controller 50. The controller 50 may be set to store past weight measurements 63 for a certain period of time, such as for a week, or may be set to store a certain number of past weight measurements 63 before over-writing the oldest weight measurements 63 with new or current weight measurements 61 thus always keeping current and near current past weight measurements 63 easily accessible to the operator. The operator may also be required to manually reset or clear past weight measurements 63 as desired.

A control button 52 accessible to the operator and preferably located adjacent the display 60 is used to access the controller 50 and memory 51 of the controller 50. The control button 52 allows for the user to select a particular past weight measurement 63 to be viewed upon the display 60 and also to alter settings of the controller 50, such as date, time, etc.

The control button 52 may be comprised of a push-button structure, switch, or various other types. Various on/off switches may also be appreciated or the on/off switch may be integral with a control button 52. Various types of casings 56 may also be utilized to enclose the controller 50, memory 51, and any other electrical components or power supplies as needed.

F. Digital Display

The display 60, being preferably in digital format, is generally located upon the platform 20 and is flush with the platform 20 along a longitudinal edge. The display 60 is generally located at a point where the pet standing upon the weighing portion 22 and accessing the feeding portion 23 will not interfere with the viewing of the display 60. The display 60 generally indicates the measured weight in pounds or kilograms; however other settings or measurement means may be appreciated.

The display 60 is connected to the controller 50 and the weight sensors 40 to indicate a current weight being measured by the weigh sensors 40 through a digital readout. The display 60 is generally able to indicate weights to the hundredth of a pound and up to 100 pounds; however other ranges may be appreciated. An exemplary "00.00" readout is illustrated in FIGS. 1 through 3.

Figure 10:
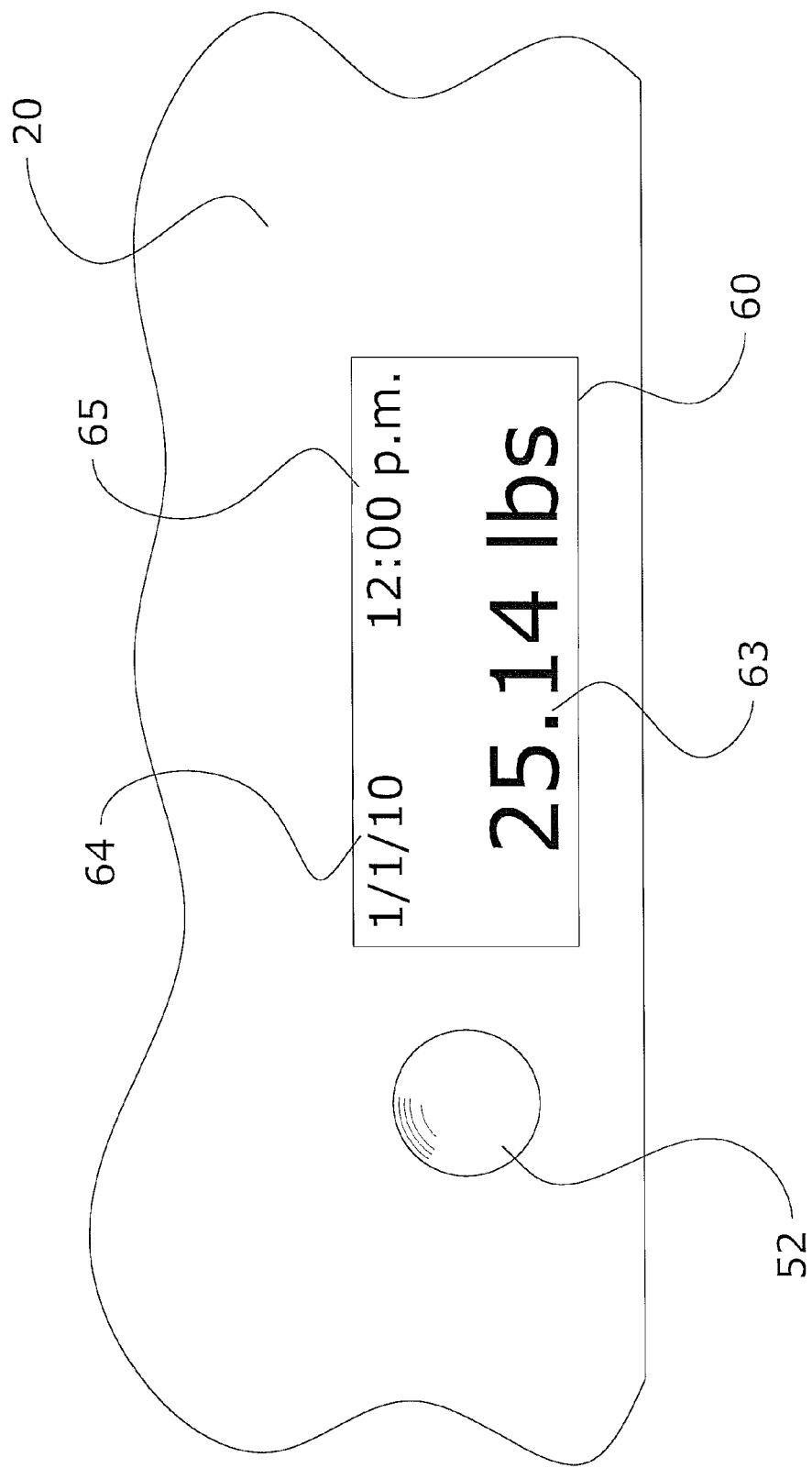
FIG. 10 is an exemplary view of the display illustrating a stored past weight measurement, date, and time being viewed.

As stated, along with illustrating current weight measurements 61, the display 60 may also illustrate past weight measurements 63 recorded by the weight sensors 40 at a given date and time as previously described. The display 60 also allows the given date and time of the past weight measurement 63 to be displayed as illustrated in FIG. 10 with the exemplary weight measurement 63, date 64, and time 65. The weight sensors 40, controller 50, and/or digital display 60 may further include various internal power supplies, such as batteries, or may be powered through various external power supplies as appreciated.

G. Sleeve

Figure 11:
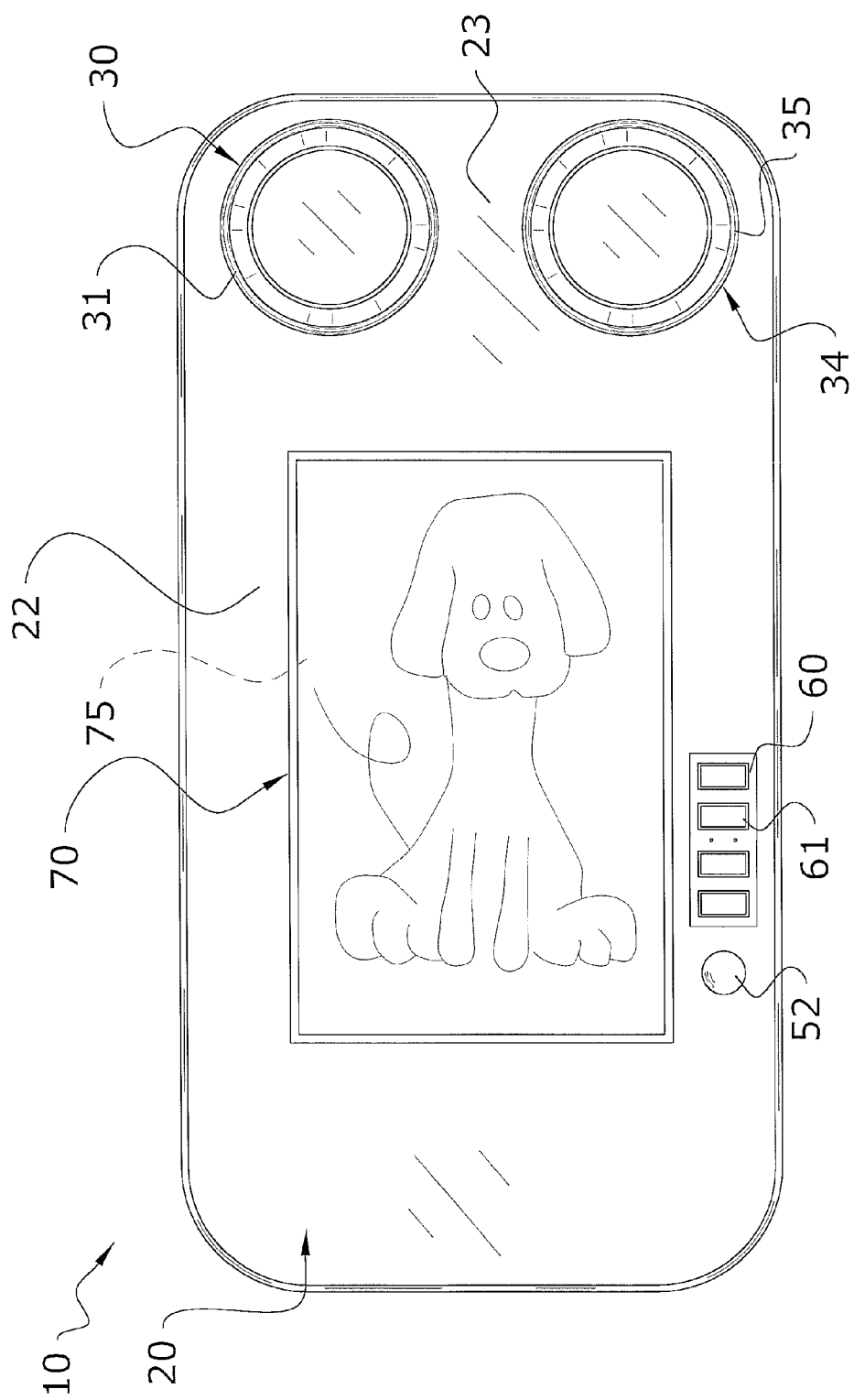
FIG. 11 is a top view of an alternate embodiment of the present invention, including the sleeve.
Figure 12:
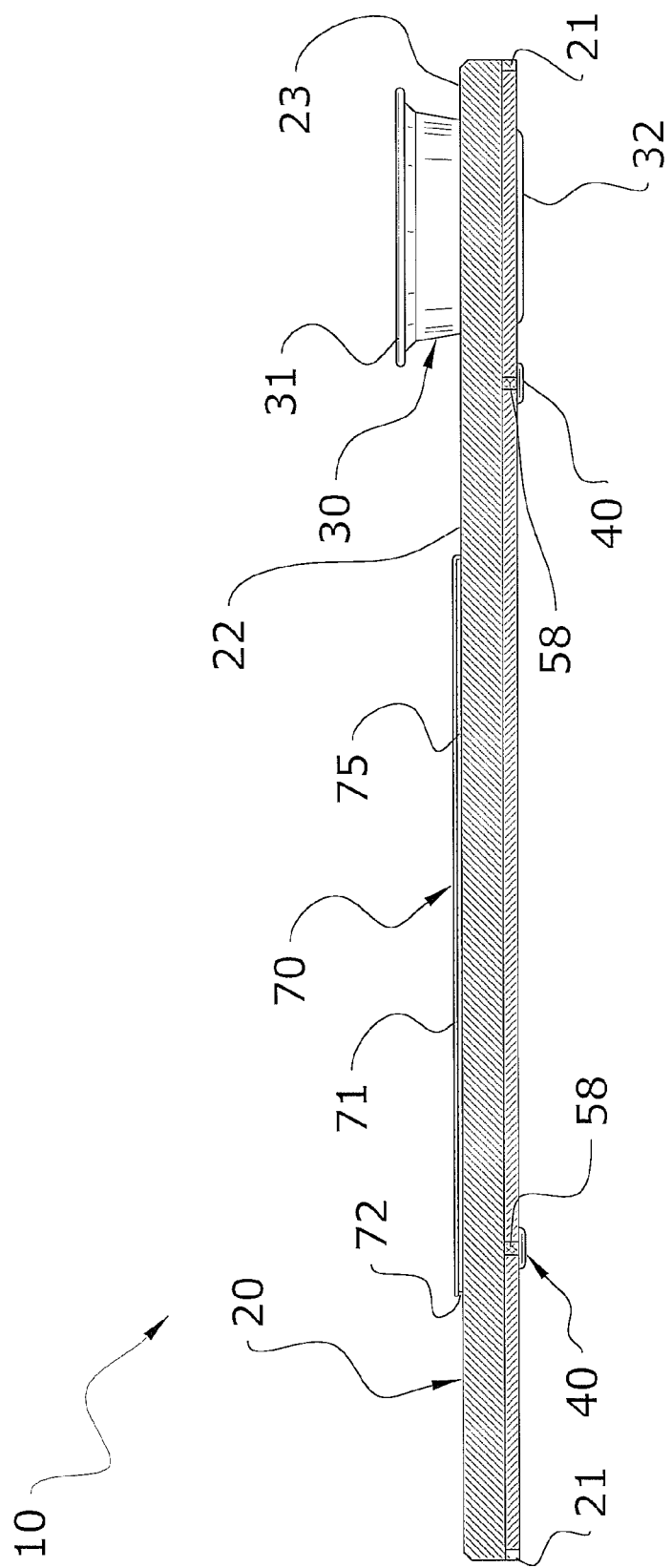
FIG. 12 is a side sectional view of the alternate embodiment illustrated in FIG. 11.

In an alternate embodiment illustrated as FIGS. 11 and 12, a sleeve 70 is illustrated upon the platform 20. The sleeve 70 would be located along the upper surface of the platform 20 for a user or pet to insert and view photographs 75, such as photographs of the pet utilizing the present invention. The sleeve 70 generally is comprised of one or more acrylic sheets 71, with at least a top sheet 71 being transparent and a pocket 72 formed between the top sheet 71 and a bottom sheet or the upper surface of the platform 20 to receive the image, drawing, or photograph 75. The sleeve 70 is generally rectangular in shape; however other shapes may be appreciated.

H. Operation of Preferred Embodiment

In use, the pet steps upon the weighing portion 22 of the platform 20 when desiring to access the feeding containers

30, 34. The pet is often in a still position while feeding thus allowing an accurate weight measurement 61 63 to be taken. As the pet stands upon the weighing portion 22, the weight sensors 40 read a measurement associated with the weight of the pet and the measurement is communicated to the controller 50 which calculates the weight in the selected units (e.g. pounds, kilograms, etc.). The calculated weight measurement 61 63 of the pet is then shown upon the digital display 60. It is appreciated that the current date, time, or any other setting may be also be shown upon the display 60 at any given time.

The operator may also view past weight measurements 61 63 and associated dates and times by operating the one or more control buttons 52 which allows the operator to access past weight measurements 61 63 stored in the memory 51 of the controller 50. The past weight measurements 61 63 may be shown upon the display 60 with the associated date and time of the measurement to allow the operator to view how their pet has changed in weight over time.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A pet feeding and weighing device, comprising:
    a platform having a feeding portion and a weighing portion;
    wherein said feeding portion including at least one opening extending therethrough;
    at least one feeding container positioned within said at least one opening;
    at least one weight sensor in communicative contact with said weighing portion; and
    a display responsive to said at least one weight sensor to indicate a weight applied upon said weighing portion of said platform over said at least one weight sensor; and,
    wherein a brim of said at least one feeding container is located above said platform and a bottom of said least one feeding container rests upon a floor surface below said platform.

2. The pet feeding and weighing device of claim 1, wherein said at least one feeding container is removably positioned within said at least one opening.

3. The pet feeding and weighing device of claim 1, wherein said at least one opening includes a first opening and a second opening.

4. The pet feeding and weighing device of claim 3, wherein said at least one feeding container includes a first feeding container positioned within said first opening and a second feeding container positioned within said second opening.

5. The pet feeding and weighing device of claim 4, wherein said first feeding container is adapted to hold pet food therein and wherein said second feeding container is adapted to hold drinking water therein.

6. The pet feeding and weighing device of claim 1, wherein said display is comprised of a digital display.

7. A pet feeding and weighing device, comprising:
    a platform having a feeding portion and a weighing portion;
    wherein said feeding portion including at least one opening extending therethrough;
    at least one feeding container positioned within said at least one opening;
    at least one weight sensor in communicative contact with said weighing portion; and
    a display responsive to said at least one weight sensor to indicate a weight applied upon said weighing portion of said platform over said at least one weight sensor; and,
    including a controller connected to said display, wherein said controller has memory for storing past weight measurements taken by said at least one weight sensor.

8. The pet feeding and weighing device of claim 7, wherein said memory of said controller stores a date and time associated with each of said past weight measurements.

9. The pet feeding and weighing device of claim 8, wherein said display selectively illustrates said date and said time along with each of said past weight measurements.

10. The pet feeding and weighing device of claim 9, including a control button for retrieving a particular said past weight measurement from said memory to be illustrated upon said display.

11. The pet feeding and weighing device of claim 1, wherein said at least one weight sensor is comprised of a plurality of weight sensors.

12. The pet feeding and weighing device of claim 1, wherein said plurality of weight sensors are each comprised of electrical load cells.

13. The pet feeding and weighing device of claim 1, wherein said at least one opening includes a rim extending from a peripheral edge below said platform.

14. The pet feeding and weighing device of claim 1, including a transparent sleeve along an upper surface of said platform for holding a photograph.

15. A pet feeding and weighing device, comprising:
    a platform having a feeding portion and a weighing portion;
    wherein said feeding portion extends from said weighing portion along a common plane;
    wherein said feeding portion including at least one opening extending therethrough;
    at least one feeding container positioned within said at least one opening;
    at least one weight sensor in communicative contact with said weighing portion;
    a digital display located along said platform, wherein said display is responsive to said at least one weight sensor to indicate a weight applied upon said weighing portion of said platform over said at least one weight sensor;
    a controller electrically connected to said display and said at least one weight sensor, wherein said controller has memory for storing past weight measurements; and
    a control button electrically connected to said controller for retrieving a particular said past weight measurement from said memory to be illustrated upon said display.

16. The pet feeding and weighing device of claim 15, wherein said at least one feeding container is removably positioned within said at least one opening.

17. The pet feeding and weighing device of claim 15, wherein a brim of said at least one feeding container is located above said platform and a bottom of said least one feeding container rests upon a floor surface below said platform.

18. The pet feeding and weighing device of claim 15, wherein said memory stores a date and time associated with each of said past weight measurements.

19. A pet feeding and weighing device, comprising:
a substantially rectangular platform, wherein said platform has rounded corners;
a plurality of support members extending along a bottom side of said platform;
wherein said platform has a feeding portion and a weighing portion;
wherein said feeding portion extends from said weighing portion along a common plane and wherein said weighing portion has a substantially larger surface area than said feeding portion;
wherein said feeding portion includes a first opening and a second opening extending therethrough;
a first feeding container removably positioned within said first opening, wherein said first feeding container is adapted to hold pet food;
wherein said first feeding container has a brim located above said feeding portion of said platform and a bottom resting upon a floor surface below said base;
a second feeding container removably positioned within said second opening, wherein said second feeding container is adapted to drinking water;
wherein said second feeding container has a brim located above said feeding portion of said platform and a bottom resting upon a floor surface below said base;
a plurality of weight sensors in communicative contact with said weighing portion;
a controller connected to said plurality of weight sensors for receiving a weight measurement from said plurality of weight sensors;
wherein said controller has memory for storing past weight measurements taken by said plurality of weight sensors and an associated date and time of each of said past weight measurements;
wherein said plurality of weight sensors are each comprised of electrical load cells;
a control button connected to said controller for retrieving a particular said past weight measurement from said memory to be displayed; and
a digital display connected to said controller and responsive to said plurality of weight sensors to indicate a weight applied upon said weighing portion of said platform over said plurality of weight sensors and also to selectively illustrate a particular said past weight measurement.

20. The pet feeding and weighing device of claim 7, wherein said at least one feeding container is removably positioned within said at least one opening.

* * * * *